United States Patent
Ubara

(12) 
(10) Patent No.: US 6,498,204 B1
(45) Date of Patent: *Dec. 24, 2002

(54) RESIN COMPOSITION AND MOLDINGS

(75) Inventor: Atsuhiko Ubara, Himeji (JP)

(73) Assignee: Idemitsu Petrochemical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 780 days.

(21) Appl. No.: 08/827,645

(22) Filed: Apr. 10, 1997

(30) Foreign Application Priority Data

Apr. 11, 1996  (JP) ............................................. 8-089326

(51) Int. Cl.⁷ ............................. C08L 89/00; C08L 1/00
(52) U.S. Cl. ............................. 524/12; 524/17; 524/21; 524/24; 524/34; 524/35
(58) Field of Search ............................. 524/17, 23, 35, 524/261, 12, 21, 34

(56) References Cited

U.S. PATENT DOCUMENTS 5,240,766 A  *  8/1993  Foster .......................... 524/34
5,272,190 A  * 12/1993  Kai et al. ...................... 524/11
5,587,411 A  * 12/1996  Sakaki et al. .................. 524/17
5,718,954 A  *  2/1998  Sano et al. .................... 524/17

FOREIGN PATENT DOCUMENTS

JP    58-142925      8/1983
JP    2252459      * 11/1987

* cited by examiner

*Primary Examiner*—Tae H. Yoon
(74) *Attorney, Agent, or Firm*—Flynn, Thiel, Boutell & Tanis, P.C.

(57) ABSTRACT

A resin composition contains a thermoplastic elastomer, natural organic, and silicone. As the thermoplastic elastomer, an olefin thermoplastic elastomer, such as a ethylene-propylene copolymer or the like, can be used. As the thermoplastic elastomer, a styrene thermoplastic elastomer, such as a styrene-butadiene copolymer or the like, can be used. As the natural organic, silk, cellulose, collagen or the like can be used. It is advisable that the content of the natural organic is 5–30 wt %, and the content of silicone is 0.3–10 wt %. Where the natural organic is a fine powder state, it is preferable that the particle size is less than 300 $\mu$m. Moldings are sheets or the like, formed by using the aforementioned resin composition.

2 Claims, No Drawings

RESIN COMPOSITION AND MOLDINGS

BACKGROUND OF THE INVENTION

1. FIELD OF THE INVENTION

This invention relates to a resin composition, containing an elastomer and moldings of a sheet or the like.

2. DESCRIPTION OF THE RELATED ART

Conventionally, a component molded to contain, for example, polyvinyl chloride as materials is used for door trims of vehicles, console-boxes, steering wheel grips of vehicles and so on. Rubber undergoing a cross-linking treatment with vulcanization is used for golf clubs and grips of ski poles. Since most of them consist of a single component material, the feel, when touched by a hand wet with perspiration or the like, sometimes differs from that of a dry hand. Depending upon the changed feel as described above, the feel characteristic of the resin is felt on the dry hand.

Further, environmental issues, caused by chlorine in polyvinyl chloride, which is produced in the waste treatment of spend resin moldings, have been presented and measures against the environmental issues are demanded. As an alternative to polyvinyl chloride, the use of a resin thermoplastic elastomer (TPE) is suggested, and predominately, the use of an olefin thermoplastic elastomer (TPO).

The feel of a product consisting of a TPO element includes a feeling of stickiness or a feeling of slipperiness. As a remedy against it, an attempt has been made to improve the feel by including an inorganic filler such as talc powder. The feelings of stickiness and slipperiness, however, are not resolved sufficiently, if anything, it tends to decrease the durability against friction due to the inorganic filler.

Moldings blending resin materials with a silicone have also been proposed (see Japanese Patent Application Laid-open No. Sho 58-142925 and the like). According to the aforementioned moldings, however, durability against friction is protected but the feelings of stickiness and slipperiness are not extensively improved.

SUMMARY OF THE INVENTION

A resin composition according to the present invention is characterized by including: a thermoplastic elastomer; a natural organic material; and a silicone.

As the thermoplastic elastomer, an olefin thermoplastic elastomer can be used.

An ethylene-propylene copolymer, an ethylene-propylene-diene copolymer and so on can be named as specific examples of the olefin thermoplastic elastomer.

Further, as the thermoplastic elastomer, a styrene thermoplastic elastomer can be also used.

A styrene-butadiene copolymer, a styrene-ethylene-butadiene copolymer and so on can be named as specific examples of the styrene thermoplastic elastomer.

As the natural organic material, silk, cellulose, collagen, wool, keratin, hemp, cotton, chitin, chitosan, betaine, egg shell membrane or the like can be used. Further, the aforementioned examples of the natural organic material can be used by being combined with plural examples thereof.

It is advisable that the content of the natural organic material is 5 wt % to 30 wt %. If the natural organic material is less than 5 wt %, an excellent feel, durability against friction, and moisture inhalation-exhalation cannot be obtained. If the natural organic content is more than 30 wt %, the soft property of the resin is damaged.

Where the natural organic material is in a fine powder state, it is advisable that the particle size of the natural organic material is less than 300 $\mu$m. An excellent feel is hard to obtain from a particle size of more than 300 $\mu$m.

It is advisable that the content of the silicone is 0.3 wt % to 10 wt %, more preferably, 0.5 wt % to 8 wt %. A silicone content of less than 0.3 wt. % is insufficient in improving the durability against friction. A silicone content of more than 10 wt % allows the mold-processability to decrease markedly.

Incidentally, required additives, such. as a, dispersing agent, a stabilizing agent, a lubricant or the like, may be added into the resin composition.

Moldings according to the present invention are formed by using the aforementioned resin composition.

Types of the moldings are selected, for example, to be sheet-shaped moldings, bottle shaped moldings, and so on.

The sheet-shaped moldings can be obtained by a calendar molding method, an extrusion molding method, or the like by using the aforementioned resin composition. Complicatedly shaped moldings (including moldings of a multi layered structure) can be obtained by an injection molding method.

The bottle-shaped moldings can be obtained by a blow molding method by using the aforementioned resin composition.

Since the moldings according to the present invention are molded by using the aforementioned resin composition, the moldings have an excellent moisture inhalation-exhalation, friction and touch-feeling, and furthermore, have a suitable hardness.

DETAILED DESCRIPTION OF THE PREFERRED EMBODIMENT(S)

A resin composition according to the preferred embodiment contains an olefin thermoplastic elastomer, 5–30 wt % of a fine powder of natural organic material, and 0.3–10 wt % of a silicone, and further includes any required additives. A styrene thermoplastic elastomer can be used instead of the olefin thermoplastic elastomer.

Moldings relating to the preferred embodiment are moldings in which the resin composition is formed to be a sheet by an extrusion molding method or the like.

Experiment 1

In the aforementioned embodiment, the resin composition is defined as follows:

90% by weight of an olefin thermoplastic elastomer, TPE3572 (a trade name) made by Sumitomo Kagaku Co., Ltd., 10% by weight of a protein fine powder, PROTEIN K-SF (a trade name) made by Idemitsu Petrochemical Co., Ltd., and 2% by weight of a silicone, SILICONE RUBBER SE6794U (a trade name) made by TORAY-DOWCORNING SILICONE CO., LTD.

As a molding according to the embodiment, a sheet of a thickness of 300 $\mu$m is obtained from the resin composition molten and kneaded in an apparatus (made by Nishimura Kougyou Co., Ltd.), having two rollers.

Experiment 2

The same resin composition and sheet as Experiment 1 is obtained, but the content of each component is changed. It contains 80% by weight of the olefin thermoplastic elastomer, 20% by weight of the natural organic material fine powder, and 2% by weight of the silicone.

Experiment 3

The same resin composition and sheet as Experiment 1 is obtained, but the content of each component is changed. It contains 80% by weight of the olefin thermoplastic elastomer, 20% by weight of the natural organic material fine powder, and 0.3 phr of the silicone.

Experiment 4

The same resin composition and sheet as Experiment 1 is obtained, but the content of each component is changed. It contains 80% by weight of the olefin thermoplastic elastomer, 20% by weight of the natural organic material fine powder, and 0.6% by weight of the silicone.

Experiment 5

The same resin composition and sheet as Experiment 1 is obtained, but the content of each component is changed. It comprises 80% by weight of the olefin thermoplastic elastomer, 20% by weight of the natural organic material fine powder, and 1.5% by weight of the silicone.

Experiment 6

The same resin composition and sheet as Experiment 1 is obtained with the use of the styrene thermoplastic elastomer, SEBS (a trade name) made by Sumitomo Bakelite Co., Ltd., instead of the olefin thermoplastic elastomer used in Experiment 1.

It comprises 90% by weight of the styrene thermoplastic elastomer, 10% by weight of the natural organic material fine powder, and 2% by weight of the silicone.

Experiment 7

The same resin composition and sheet as Experiment 6 is obtained, but the content of each component is changed. It comprises 80% by weight of the styrene thermoplastic elastomer, 20% by weight of the natural organic material fine powder, and 2% by weight of the silicone.

Experiment 8

The same resin composition and sheet as Experiment 1 is obtained with the use of cellulose fine powder L-SF (a trade name) made by Idemitsu Petrochemical Co., Ltd., instead of the protein fine powder used in Experiment 1.

It comprises 80% by weight of the styrene thermoplastic elastomer, 10% by weight of the natural organic fine powder, and 2% by weight of the silicone.

Comparison 1

100% by weight of an olefin thermoplastic elastomer element instead of the resin composition used in Experiment 1 is used.

Comparison 2

The resin composition of Comparison 2 consists of 100% by weight of the olefin thermoplastic elastomer, relating to Experiment 1 and 2% by weight of the silicone.

Comparison 3

The resin composition of Comparison 3 consists of 90% by weight of the olefin thermoplastic elastomer, relating to Experiment 1, and 10% by weight of protein fine powder.

Comparison 4

The resin composition of Comparison 4 consists of 80% by weight of the olefin thermoplastic elastomer, relating to Experiment 1, and 20% by weight of protein fine powder.

Comparison 5

The resin composition of Comparison 5 consists of 80% by weight of the olefin thermoplastic elastomer, relating to Experiment 1, 20% by weight of calcium carbonate, KS-2100 (a trade name) made by Dowa Karufine Co., Ltd., and 2% by weight of the silicone.

Comparison 6

The resin composition of Comparison 6 consists of 80% by weight of the olefin thermoplastic elastomer, relating to Experiment 1, 10 phr of talc, JA-46R (a trade name) made by Asada Seifun Co., Ltd., and 2 phr of the silicone.

Comparison 7

100% by weight of a styrene thermoplastic elastomer element instead of the resin composition used in Experiment 6.

Comparison 8

The resin composition of Comparison 8 consists of 90% by weight of the styrene thermoplastic elastomer, relating to Experiment 6, and 10% by weight of the protein fine powder.

Comparison 9

The resin composition of Comparison 9 consists of 90% by weight of a styrene thermoplastic elastomer, relating to Experiment 6, and 20% by weight of the protein fine powder.

Comparison 10

The resin composition of Comparison 10 consists of 100% by weight of the styrene thermoplastic elastomer, relating to Experiment 6, and 2% by weight of the silicone.

Comparison 11

The resin composition of Comparison 11 consists of 90% by weight of the styrene thermoplastic elastomer, relating to Experiment 6, 10% by weight of calcium carbonate, and 2% by weight of the silicone.

Evaluation of Property

The sheets obtained in Experiments 1–8 are evaluated in regard to moisture inhalation-exhalation, friction, hardness, and touch-feeling (feel). The following Table 1 provides the results of the evaluations. In Table 1, TPO is the olefin thermoplastic elastomer and TPS is the styrene thermoplastic elastomer.

Moisture inhalation of the aforementioned moisture inhalation-exhalation is evaluated by measuring the weight-change par unit volume after the sheet is placed in an atmosphere with relative humidity at 80% and a temperature of 23° C. for four hours to absorb moisture. Moisture exhalation is evaluated by measuring the weight-change par unit volume after the sheet, having absorbed the moisture above, is placed in an atmosphere with a relative humidity of 30% and a temperature of 23° C. for four hours to release the moisture.

Friction is evaluated by measuring the dynamic coefficient of friction from a load when the sheet is slid while supporting a weight of 330 g on a metal plate placed thereon. This measurement is carried out under two conditions in which the metal plate is dry and is moist.

Hardness is evaluated by measuring the sheets, multiply layered to a thickness of 15 mm, with a JIS-A type hardness meter.

Touch-feeling (feel) is evaluated with the following criterion based on the feel when a hand touches the surface of the sheet. The evaluation is carried out by ten persons and an average of the ten results is taken.

Five-point grade: excellent and smooth feel. Four-point grade: good and smooth feel. Three-point grade: standard.

Two-point grade bad and sticky feel. One-point grade: worse and sticky feel.

Further, the sheets obtained in Comparison 1–11 are also evaluated in regard to moisture inhalation-exhalation, friction, hardness, and touch-feeling (feel). The results are shown in the following Table 2.

TABLE 1

|  | E1 | E2 | E3 | E4 | E5 | E6 | E7 | E8 |
|---|---|---|---|---|---|---|---|---|
| TPO (% by weight) | 90 | 80 | 80 | 80 | 80 | 0 | 0 | 0 |
| TPS (% by weight) | 0 | 0 | 0 | 0 | 0 | 90 | 80 | 80 |
| Powder (% by weight) | 10 | 20 | 20 | 20 | 20 | 10 | 20 | 20 |
| Silicone (% by weight) | 2 | 2 | 0.3 | 0.6 | 1.5 | 2 | 2 | 2 |
| *1 *2 (g/cm$^2$) | 1.0 | 1.3 | 1.5 | 1.4 | 1.3 | 1.0 | 1.5 | 1.1 |
| *3 (g/cm$^2$) | 0.7 | 0.9 | 0.8 | 0.8 | 0.6 | 0.4 | 0.7 | 0.7 |
| *4 (g/cm$^2$) | 0.3 | 0.4 | 0.7 | 0.6 | 0.7 | 0.6 | 0.8 | 0.4 |
| *5 Dry | 0.18 | 0.16 | 0.24 | 0.16 | 0.15 | 0.13 | 0.13 | 0.17 |
| Moisture | 0.14 | 0.14 | 0.15 | 0.13 | 0.12 | 0.14 | 0.13 | 0.15 |
| Hardness | 48 | 52 | 48 | 48 | 48 | 59 | 62 | 53 |
| Feel | 5 | 5 | 3 | 4 | 5 | 5 | 5 | 5 |

C is Comparison
*1 is Moisture inhalation-exhalation
*2 is An amount of moisture inhalation
*3 is An amount of moisture exhalation
*4 is An amount of remained moisture
*5 is Friction tain the natural organic material fine powder and thus is inferior in the respects of moisture inhalation-exhalation and touch-feeling.

The sheets obtained in Comparisons 3 and 4 contain the olefin thermoplastic elastomer and the natural organic material fine powder, but do not contain the silicone and thus are inferior in dry friction.

The sheets obtained in Comparisons 5 and 6 contain the olefin thermoplastic elastomer and the silicone, and an inorganic material fine powder instead of the natural organic material fine powder and thus are inferior in respect of moisture inhalation-exhalation. Incidentally, the sheet of Comparison 6 is also inferior in respect to touch-feeling.

The sheet obtained in Comparison 7 consists of the styrene thermoplastic elastomer element not containing the natural organic material fine powder or the silicone and thus is inferior in the respects of moisture inhalation-exhalation, dry friction and touch-feeling.

The sheets obtained, in Comparisons 8 and 9 contain the styrene thermoplastic elastomer and the natural organic material fine powder but do not contain the silicone and thus have friction properties inferior to the sheet containing the silicone (Experiments 6 and 7). The sheet obtained in Comparison 10 contains the styrene thermoplastic elastomer and the silicone, but does not contain the natural organic material fine powder and thus is inferior in the respects of moisture inhalation-exhalation and touch-feeling.

The sheet obtained in Comparison 11 contains the styrene thermoplastic elastomer and the silicone, and the inorganic

TABLE 2

|  | C1 | C2 | C3 | C4 | C5 | C6 | C7 | C8 | C9 | C10 | C11 |
|---|---|---|---|---|---|---|---|---|---|---|---|
| TPO (% by weight) | 100 | 100 | 90 | 80 | 80 | 90 | 0 | 0 | 0 | 0 | 0 |
| TPS (% by weight) | 0 | 0 | 0 | 0 | 0 | 0 | 100 | 90 | 80 | 100 | 90 |
| Powder (% by weight) | 0 | 0 | 10 | 20 | 20 | 10 | 0 | 10 | 20 | 0 | 10 |
| Silicone (% by weight) | 0 | 2 | 0 | 0 | 2 | 2 | 0 | 0 | 0 | 2 | 2 |
| *1 *2 (g/cm$^2$) | 0 | 0 | 1.0 | 1.4 | 0.3 | 0.2 | 0.2 | 0.8 | 1.5 | 0.1 | 0.2 |
| *3 (g/cm$^2$) | 0 | 0 | 0.7 | 0.7 | 0.3 | 0.2 | 0.2 | 0.3 | 0.7 | 0.1 | 0.2 |
| *4 (g/cm$^2$) | 0 | 0 | 0.3 | 0.7 | 0 | 0 | 0 | 0.5 | 0.8 | 0 | 0 |
| *5 Dry | 0.39 | 0.28 | 0.29 | 0.27 | 0.18 | 0.22 | 0.36 | 0.27 | 0.22 | 0.19 | 0.16 |
| Moisture | 0.17 | 0.15 | 0.17 | 0.18 | 0.11 | 0.18 | 0.10 | 0.16 | 0.15 | 0.14 | 0.14 |
| Hardness | 44 | 44 | 48 | 52 | 56 | 50 | 56 | 59 | 62 | 56 | 61 |
| Feel | 1 | 1 | 3 | 3 | 3 | 2 | 1 | 3 | 3 | 1 | 2 |

C is Comparison
*1 is Moisture inhalation-exhalation
*2 is An amount of moisture inhalation
*3 is An amount of moisture exhalation
*4 is An amount of remained moisture
*5 is Friction It is understood from Table 1 that the sheets obtained in Experiments 1–8 are satisfactory in all respects of moisture inhalation-exhalation, friction, hardness and touch-feeling, since the sheets are composed of a resin composition containing the olefin thermoplastic elastomer or the styrene thermoplastic elastomer, the natural organic material fine powder and the silicone.

It is, however, understood from Table 2 that the sheet obtained in Comparison 1 is inferior in respects of moisture inhalation-exhalation, dry friction and touch-feeling, since the sheet consists of the olefin thermoplastic elastomer element not containing the natural organic material fine powder or the silicone.

The sheet obtained in Comparison 2 contains the olefin thermoplastic elastomer and the silicone, but does not conmaterial fine powder instead of the natural organic material fine powder and thus is inferior in the respects of moisture inhalation-exhalation and touch-feeling.

What is claimed is:

1. A molding produced by forming a resin composition consisting essentially of 5–30 wt. % of a natural organic material selected from the group consisting of silk, cellulose, wool, hemp, cotton, chitin, betaine, and egg shell membrane, a thermoplastic elastomer and 0.3–10 wt. % of a silicone rubber.

2. The molding according to claim 1, wherein the natural organic material is at least one member selected from the group consisting of silk, cellulose, wool, hemp and cotton.

* * * * *